June 6, 1950     C. H. JOHNSON     2,510,501
WIND TURBINE

Filed July 22, 1946     2 Sheets-Sheet 1

Inventor

Carl H. Johnson

By *Clarence A. O'Brien and Harvey B. Jacobson*
Attorneys

June 6, 1950     C. H. JOHNSON     2,510,501
WIND TURBINE

Filed July 22, 1946     2 Sheets-Sheet 2

Inventor
Carl H. Johnson

Patented June 6, 1950

2,510,501

UNITED STATES PATENT OFFICE 2,510,501

WIND TURBINE

Carl H. Johnson, Cadogan, Alberta, Canada, assignor of one-third to Glenn Martfeld and one-third to Donald Martfeld, both of Luseland, Saskatchewan, Canada Application July 22, 1946, Serial No. 685,523

1 Claim. (Cl. 170—17)

My invention pertains to novel and useful improvements in a wind turbine and more especially has reference to a mechanism for harnessing the energy of the wind in an improved manner to develop power and produce electricity.

The primary object of my invention resides in devising an apparatus for harnessing the energy of the wind and air currents; to produce a more even power output from varying winds; to utilize winds from various directions with efficiency; to apply the principles and effectiveness of the turbine to a wind motor; to accurately and effectively control the range of power developed by the invention.

Auxiliary objects of the invention consist in providing a mechanism in accordance with the foregoing objects, which is of simple construction; may readily be constructed in any desired size; has improved means for reducing wear upon the bearings; is particularly adapted for fabrication from widely disseminated materials such as wood or the like; and is withall, inexpensive, durable and reliable in operation.

Figure 1:
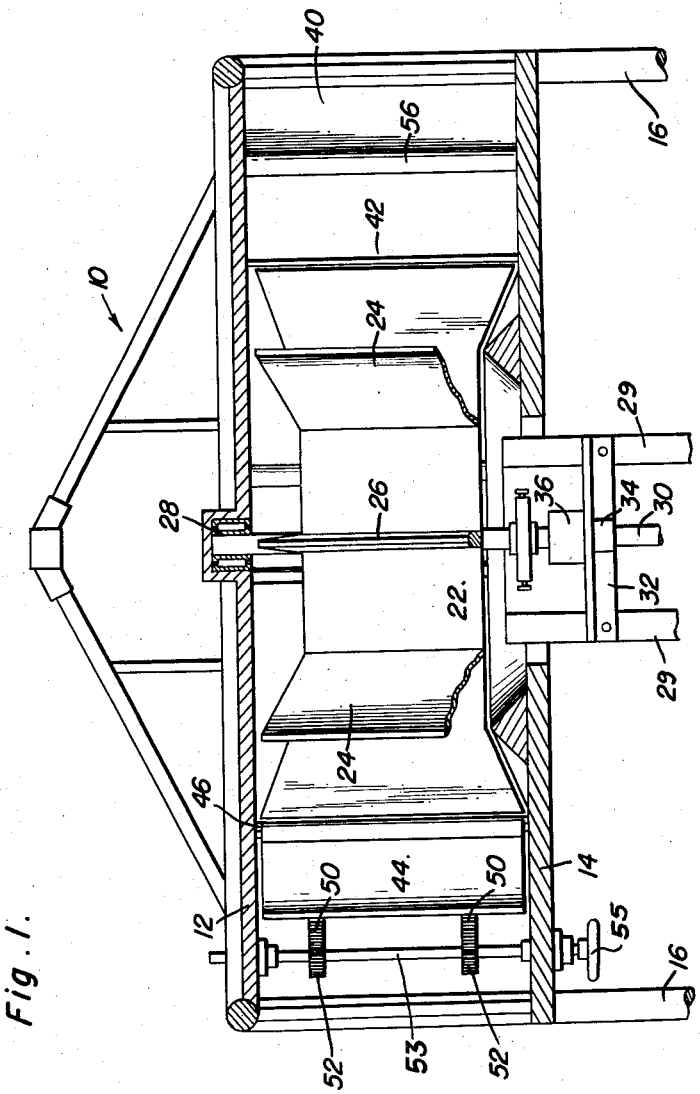
Figure 2:
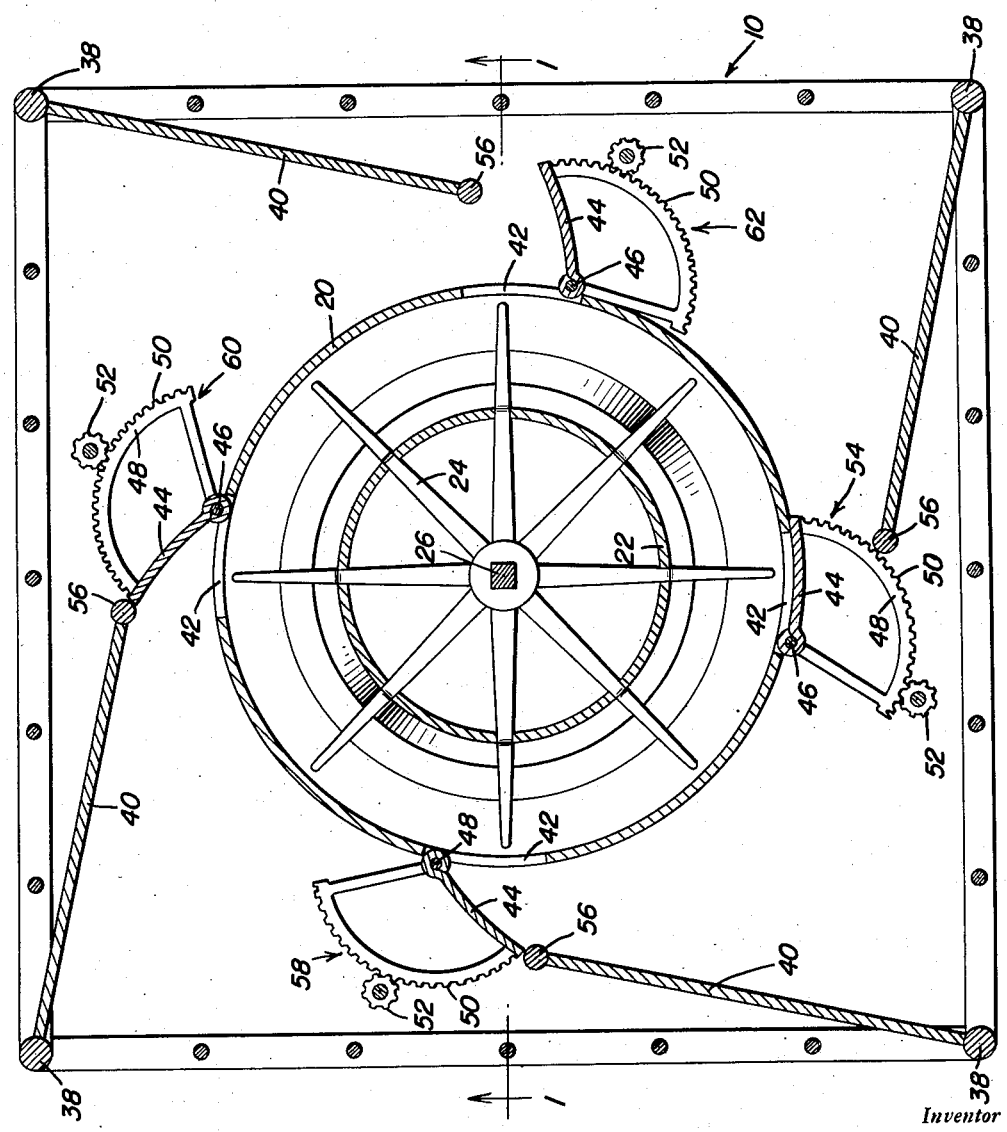

These, together with numerous other objects which will later become apparent as the following description proceeds, are attained by my device, one embodiment of which has been illustrated by way of example only in the accompanying drawings, wherein:

Figure 1 is a sectional view taken substantially in the plane of section line 1—1 of Figure 2; and Figure 2 is a horizontal sectional view through the device shown in Figure 1.

Specific reference is now made to the drawings. In the several views in the accompanying drawings and in the following specification similar reference characters indicate corresponding elements throughout.

Generally indicated at 10 is the framework which supports and encloses my invention. The housing 10 consists of upper and lower walls 12 and 14 respectively, supported in spaced relation to each other on a plurality of vertical supports 16. A cylindrical wall 20 extending between the partitions 12 and 14 defines a turbine chamber within which is axially mounted for revolution about a vertical axis, a drum-like rotor member 22 having a plurality of radially disposed vanes 24 extending therefrom into close proximity with the surrounding wall 20. The rotor 22 is rigidly fixed to a vertically disposed rotor axle 26 whose upper end is journaled in a suitable bearing 28 formed in the upper wall 12. Extending between the partition 14 and a base (not shown) are a pair of parallel standards 29 surrounding the lower portion of the shaft 30 and supporting by means of crossbars 32 a bracket 34 which assists in journalling the shaft 26. It should be here noted that the upper surface of the bearing 34 constitutes a supporting surface for a collar 36 secured to the shaft 26 whereby the weight of the rotor is received upon the bearing 34. At its lower end, the shaft 30 is drivingly connected to any suitable load to be driven by the turbine.

The housing or framework 10 is preferably constructed as a many sided figure which, as shown in Figure 2, may conveniently consist of a square or rectangle, each of whose sides constitutes an air inlet or exhaust means selectively. Extending from each of the corners 38 of the housing is a partition member 40 disposed substantially tangentially of the cylindrical turbine housing 20. The partition members 40 extend between the upper and lower walls 12 and 14 respectively, and form therewith a funnel-shaped inlet at each side of the housing 10. At appropriately spaced points about its circumference, the casing 20 is provided with a series of apertures 42, there being one such aperture provided for each of the funnels formed by the partitions 40. A series of gates indicated at 44 is provided for controlling the apertures and cooperating with the corresponding partitions 40. Each gate 44 is pivoted as at 46 to the casing 20, and extends between the upper and lower walls 12 and 14, and is roughly sector in shape, having an arcuately-shaped outer portion 48 provided with gear teeth 50 for engagement and actuation by a pinion 52. Any suitable means may be provided for actuating the pinion 52, and one such means may conveniently consist of an electric motor (not shown). The means shown in the drawings consists of a shaft 53 journaled between the upper wall 12 and the partition 14 upon which the pinion 52 is mounted, the shaft including the manually operable hand wheel 55. As shown by the various positions of the gate 44 in Figure 2, the gate may be oscillated about its pivot 46 to completely close the aperture 42 and at the same time close the exit of a corresponding partition 40 of one of the funnels, or may be partially opened to admit air from a funnel into an aperture 42 while closing the opening between a partition 40 and the cylindrical housing 20 or alternatively, may be opened wide to provide a passageway from an open aperture 42 and past the end of a partition 48.

To more clearly illustrate the operation of the gates and funnels, it will be assumed that the normal current of air is coming from the right side of Figure 2. With this direction of wind, the gate indicated at 54 is disposed and positioned to fully close its corresponding aperture 42 to engage and seal the end 56 of the partition 40. The gate 58 is disposed and positioned to open the corresponding aperture 42 but also engages the end 56 of the adjacent partition 40, whereby the funnel enclosed between the gates 54 and 58 is supplying a blast of wind through the aperture 42 and against the vanes 24 in the turbine chamber between the concentric walls 20 and 22. At the same time the gate 60 is arranged in a position similar to that of gate 58 whereby a supplemental blast of air into the funnel between the gates 58 and 60 will enter the aperture 42 adjacent the gate 60 to assist in producing rotation of the turbine blades 24. The gate indicated at 62 is now disposed in its fully open position, fully uncovering the adjacent aperture 42 and providing a passageway between the end of a partition 40 and the gate 62, whereby the exhaust from the turbine may pass out of the funnel formed at the top of Figure 2. It will be readily understood that in the event the wind comes from some other direction, the series of gates are appropriately manipulated in order to obtain the foregoing operation.

From the foregoing it is believed that the principles of operation of my invention will be apparent to those skilled in the art. As will be evident, the construction of this device lends itself readily to the employment of such readily available materials as lumber or the like, and the apparatus may be employed in any desired size, one such embodiment which I have found to be extremely practical, consisting of a turbine twenty-four feet in diameter and ten feet high, with side walls of the casing 10 extending forty feet to a side. The device may be sturdily reinforced to resist the force of gales and is intended primarily for use in remote locations which are inaccessible to electric power lines and where a substantial source of reliable power is required.

Since it will be obvious that the principles of my invention may be applied to various types of constructions, I do not wish to limit myself to the exact construction shown in the drawings, but may avail myself of any suitable modifications falling within the scope of the appended claim.

I claim as my invention:

In a wind motor having a rotor and a casing therefor, a means for driving said rotor from selected positions about said casing comprising spaced apertures in the walls of said casing, gates pivoted to said casing adjacent said apertures, means for independently operating said gates, and wind receiving funnel means associated with each of said gates, each of said gates including an arcuated baffle adapted to overlie one of said apertures, said operating means including an arcuated rack bar carried by said baffle and a rotatable pin engaged with said rack bar, said funnel means including a substantially rectangular housing, each side of which constitutes air inlet and exhaust means, and inwardly inclined partitions secured to the corners of said housing terminating adjacent each of said apertures and adapted to abut each of said rack bars after a predetermined movement of each of said gates towards each of said apertures.

CARL H. JOHNSON.

REFERENCES CITED

The following references are of record in the file of this patent:

UNITED STATES PATENTS

| Number | Name | Date |
|---|---|---|
| 320,190 | Stoddard | June 16, 1885 |
| 377,602 | Cooper | Feb. 7, 1888 |
| 875,290 | Ruggles | Dec. 31, 1907 |
| 996,334 | Haskens | June 27, 1911 |
| 1,152,666 | Sterner | Sept. 7, 1915 |
| 1,423,514 | Butusov | July 25, 1922 |
| 1,571,303 | Schafran | Feb. 2, 1926 |
| 1,633,460 | Silverstrin | June 21, 1927 |
| 1,646,723 | Bonetto | Oct. 25, 1927 |
| 1,654,165 | Felt | Dec. 27, 1927 |
| 1,677,745 | Bonetto | July 17, 1928 |
| 1,703,064 | Griffiths | Feb. 19, 1929 |
| 2,024,531 | Lyons | Dec. 17, 1935 |